United States Patent [19]

Claflin

[11] 3,928,023

[45] Dec. 23, 1975

[54] METHOD OF TREATING OFF GASES FROM IRON PROCESSES

[75] Inventor: Harry B. Claflin, Upland, Calif.

[73] Assignee: Kaiser Steel Corporation, Oakland, Calif.

[22] Filed: Sept. 20, 1973

[21] Appl. No.: 399,260

Related U.S. Application Data

[62] Division of Ser. No. 221,900, Jan. 31, 1972, Pat. No. 3,814,404.

[52] U.S. Cl. .......................................... 75/60; 75/25
[51] Int. Cl.² ...................... C21C 7/00; C21B 3/04
[58] Field of Search .................................. 75/60, 25

[56] References Cited
UNITED STATES PATENTS

| | | | |
|---|---|---|---|
| 2,631,178 | 3/1953 | Morton | 75/25 |
| 3,372,528 | 3/1968 | Hoff | 75/25 |
| 3,511,642 | 5/1970 | Etherington | 75/26 |

OTHER PUBLICATIONS

Gumz, "Gas Producers and Blast Furnaces," pp. 136–137 (1950).
"Koppers Digest of Gas Fundamental," pp. 59–60.

*Primary Examiner*—Peter D. Rosenberg

[57] ABSTRACT

A blast furnace of improved and more readily controllable operation which comprises three sets of tuyeres, i.e., the normal or primary tuyeres at the base or melting zone of the furnace, a second set disposed in the bosh or second zone, preferably above the middle thereof and below the mantel, and a third set of tuyeres disposed in a third zone above the bosh zone and preferably just above the mantel. The second and third tuyere sets are used to introduce reducing gas which mixes with that generated in the furnace to create, limit and control the second and third zones. The furnace atmosphere and operation are controlled and temperatures regulated in each zone to improve permeability of the burden, rate and completion of the reduction and smelting of ore to hot metal and improved utilization of the burden coke by controlled introduction of increments of reducing gases into each of the second and third sets of tuyeres and thence to the furnace zones so formed. Means of re-forming offtake stack gases and of generating reducing gas from a low cost source to provide reducing gases for such introduction are associated with the blast furnace in an advantageous embodiment. A method of operation in reducing ores, for example iron ores, and a system for such operation with production of suitable reducing gases are also provided.

6 Claims, 2 Drawing Figures

METHOD OF TREATING OFF GASES FROM IRON PROCESSES

RELATED APPLICATIONS

This is a division of application Ser. No. 221,900, filed Jan. 31, 1972, now U.S. Pat. No. 3,814,404.

BACKGROUND OF THE INVENTION

This invention relates to an improved blast furnace having a normal or primary set of tuyeres and a secondary and a tertiary set of tuyeres to provide three separately controllable zones in such furnace, thereby enabling better control of the furnace operation. In a particular manner, the invention relates to a method of controlling operation of a blast furnace by introducing reducing gas at two levels of such a furnace to form three controlled reaction zones, to improve the economy and effectiveness of the ore-reducing and smelting process. This can be carried out in a system wherein a portion of the necessary reducing gas, containing carbon monoxide and hydrogen, is provided from outside the blast furnace by a converter which, among other things, can reform a portion of the blast furnace top gases as well as generate reducing gas in the process.

The modern blast furnace operator is searching for improved ways of advantageously controlling the blast furnace process. The main effort has been to regulate the top and bottom inputs of the furnace in such a way as to reduce hot metal cost per ton, increase tons of metal, for example pig iron produced per hour, and make a uniformly satisfactory quality hot metal. Often the ability to optimize one of these objectives as circumstances may require is also sought. The present invention will make it possible to achieve these objectives by providing ways and means of creating and closely controlling three distinct zones within the furnace. Each such zone will perform its principal functions better than such furnace functions are presently performed and the operator's ability to control what happens throughout the furnace will be substantially increased.

A major opportunity for reducing cost is by reducing the cost of the materials used to provide heat for the process and the reducing agent required to convert metal oxides such as iron oxide to the metal. At the present time, blast furnace coke is the most costly raw material used, and the supply of coking coal from which a suitable coke can be made is rapidly decreasing. The various means previously known for reducing the coke requirements have included reducing blast furnace heat requirements by better burden preparation, e.g., by modifying the sizing or chemical composition thereof (a top input control), increasing the heat furnished by the blast and injecting materials into the furnace through the tuyeres or close above through auxiliary tuyeres (bottom input controls). Each time an innovation has been hitherto put into effect the operator has again shortly reached a point where the furnace has failed to operate smoothly. The burden ceases to move down steadily, the furnace refuses to continuously accept the amount of wind blown, blow-throughs may occur in the top and the hot metal analysis may become variable and frequently contains so much sulphur that quality is impaired in later processes. The operator then normally retreats slightly and resorts to some combination of increasing coke or modifying other top inputs or decreasing the blowing rate or hot blast temperature or modifying other bottom inputs. The present invention, on the other hand, by recognizing and providing a means of counteracting the conditions conducive to irregular operations where they occur in the furnace provides a unique way of reducing the coke rate substantially before the troublesome conditions will reappear or the quality of the hot metal will become impaired.

In the prior art, as exemplified by U.S. Pat. Nos. 1,755,845; 2,700,711; 3,458,307; 3,594,154 and 3,589,606, many steps have been taken which tend to increase the production rate. Improved operating practices have also been used. For example, sizing the burden to provide improved burden permeability (top input control) achieves increased production by facilitating indirect reduction of the ore, that is, reduction using CO or $H_2$ under conditions which prevent the $CO_2$ and $H_2O$ formed from reacting with the burden coke to again form CO and $H_2$, and by allowing higher blowing rates without causing irregular furnace operation. By reducing the heat requirements of the burden (top input control) or by increasing the temperature of the blast within certain limits (bottom input control), both a coke savings per ton of hot metal and increased production have frequently been achieved. Lower coke charges per ton of hot metal have tended to decrease burden permeability, however, limiting the blowing rate and partially offsetting the coke requirement reduction by increasing radiation losses. After achieving a relatively small improvement, an erratic furnace operation adversely affecting the quality of the hot metal has frequently been the result. Making adjustments only from the top and at the bottom or near the bottom of the furnace, it is difficult to advantageously control the major reactions taking place throughout the stack.

When blowing rates exceed optimum for the burden permeability existing under a given set of burden characteristics and furnace conditions, the gases generated by the combustion of coke at the tuyeres can not force their way upward in a smooth even manner through the burden against the downward stream of molten material. What happens is that too much gas tries to go through too small a composite aperture partially filled by molten metal and slag. The gas flow, instead of moving up somewhat evenly through the mass of the burden moving downward, follows lines of least resistance and tends to create bridges, channels, and voids in the burden. The normal ore reduction process and transmission of heat from the ascending gases to the descending burden becomes highly irregular. Blow-throughs can occur. An individual faster-than-normal flowing column of high temperature gas unimpeded by the normal amount of contact with burden materials reaches the top of the burden column, raising the temperature of the exit gas. Furnaces frequently hang (the burden does not move down) until the pressure is relieved by "checking" the incoming blast (reducing the blowing rate) to the degree required to make the burden move.

During the checking operation, the nature of the downward movement can be abnormal and portions of the burden may arrive at critical points in the furnace without being changed progressively in an orderly downward movement. Production may be lost or reduced, and variations in quality may occur.

During the checking operation the volume of the blast is reduced, often substantially. When the volume of blast introduced during the high volume blowing cycle plus that during the check period is less than could have been introduced at a steady lower blowing rate, the overall result is a reduction in the average tons of hot metal which can be produced per hour.

Frequently a furnace progressively accepts a reduced rate of flow, i.e., as cubic feet of blast per minute. This happens when the holes between the particles plug up. A major cause of the elimination or reduction of interstices is related to the lower melting point of FeO versus Fe. When gases hot enough to melt unreduced iron oxide reach a portion of the furnace containing it, they may melt these iron oxide particles before they reduce them to iron, due to moving too fast or to insufficient reducing gas content. The iron then freezes in the interstices when it is reduced before reaching the higher melting temperature requirement of iron. FeO in molten slag may also tend to make it froth and impair burden permeability. When burden permeability becomes sufficiently impaired, it can only be restored by a checking operation or by taking more drastic steps.

High temperature local areas extending up into the furnace result when the flow of gas through a critical portion of the furnace becomes partially impeded. These are formed when the upward pressure below a zone of impaired permeability builds up and then the gas finds points of least resistance and pushes through them to form voids of sufficient magnitude to relieve the pressure.

The portions of the burden column which are usually the most resistant to the upward movement of furnace gas are located in the bosh. The constriction normally occurs in that portion of this zone where there is a flow of slow-moving semi-molten material into the burden interstices or adjoining the tuyere zone where there is a heavy downward flow of molten burden constituents through the carbon grate composed of coke, which is continuously being consumed and renewed. The grate is consumed by being burned by blast oxygen to $CO_2$ ($O_2 + C = CO_2$) and by the reduction of the $CO_2$ to CO by hot (1000°C and up) coke carbon ($CO_2 + C = 2CO$).

Moves made to decrease coke consumption without compensating changes tend to upset the counter-current flow of molten material downward and bosh gas upward. For example, when higher blast temperatures are used to replace some of the burden coke, a sequence of reactions takes place. The extent of the coke grate is reduced (the coke per ton of hot metal is reduced). At the same blowing rate, the downward flow per minute of molten material increases, increasing the difficulty encountered by the gas in working its way up through the interstices. The high heat zone tends to extend higher in the furnace where unreduced iron oxide may be encountered to a critical degree. The amount of reducing gas generated from coke per ton of hot metal is reduced to the extent of the reduction in coke per ton of hot metal, increasing the likelihood that unreduced FeO will reach a point low enough in the stack to melt before it can be reduced to iron. Then, when it is reduced to Fe, it tends to partially solidify, stopping up interstices.

Injections at the primary tuyeres, such as steam, oil, coal tar, natural gas, crushed coal and crushed coke, are used to partially offset increased blast temperatures. Such injections, to varying degrees, reduce the flame temperature and also replace the reducing gas lost. The reducing gas generated from them, however, must, along with the gas generated from the remaining coke, push its way up through the critical bosh area in competition with an increased downward flow of slag and molten iron. Assuming a constant blowing rate (oxygen intake), there may be a substantial net increase in molten material flow per hour under these conditions, resulting from an increase in tons of hot metal produced per hour, especially on the basis of coke consumed per ton of hot metal, which will be less because of the introduction of reducing agents from other sources. The size of the composite increase is controlled only to a relatively small degree by the reduced amount of coke-related slag required. When the required burden permeability versus the gas volumes generated in the bosh is not maintained, hanging results. High temperature heat requirements (those over approximately 1000°C) must be met or the hearth will cool, endangering the entire process. This frequently is a controlling factor when using primary tuyere additions. Additions made in the same high temperature area through secondary tuyeres will be subject to the same limitations.

The use of $O_2$ blast enrichment, such as the use of oxygenenriched air, along with hydrocarbon injections at the primary tuyeres, can help to provide the high temperature heat requirements and can also make up for the lesser volume of reducing gas as would be formed from the lesser amount of coke to be added in the burden. Such enrichment also reduces the volume of exit gas to the extent of the $N_2$ from air replaced in the blast. The adiabatic flame temperature at the primary tuyeres will increase if, to further decrease the total gas volume of inert $N_2$ that must flow upward, more $O_2$ is used in the high temperature blast per ton of hot metal. When the high temperature zone moves higher in the stack due to the flame temperature increase, premature melting of iron oxide, for example, takes place and the $CO_2$ formed in reducing the FeO to iron is again reduced by coke, using coke needed in the bosh area adjoining the tuyeres to form the consumable grate required there. Flooding, i.e., the forcing of molten material back up into the interstices, may occur at such increased blowing rates. Hanging again results in the furnace.

The burden charged at the top, made up of metal-bearing materials such as ore, sinter, pellets or the like, coke and fluxing materials, must be preheated as it moves down the stack, the metal sources must be reduced from the oxide to the metallic form and the slag and metal produced must be heated to required molten temperatures prior to withdrawal. In one mode of operation, the molten temperature is so selected as to control the sulphur content of the metal.

To accomplish these ends, high temperature heat, over 1000°C., must be generated or introduced at the bottom to smelt the burden. Sufficient reducing gas must be generated or introduced to accomplish metal oxide reduction as such gas moves up through the burden, and adequate heat must be transmitted by the up-moving gas to the burden as it progresses down the stack to drive off moisture, calcine limestone and effect reduction.

The present invention departs from the prevailing concept of controlling the operation from the top and the bottom (what is charged at the top or what is blown in at the bottom through the primary tuyeres) and provides a means for creating three separate zones of activity where different functions will be performed in the most advantageous sequence. It also teaches the way they will be controlled to reduce undesirable overlapping and minimize the magnitude of conflicting activities.

SUMMARY OF THE INVENTION

This invention relates to a method of operating a blast furnace for the production of metals such as iron, nickel, copper, lead, etc.; and more particularly, it relates to such method wherein three zones of such furnace are controlled individually to provide more uniform operation thereof and to achieve advantageous ecological and economic results.

In the method of this invention a primary, a secondary and a tertiary zone are provided in a blast furnace. In the primary zone, which is that adjacent to the primary tuyeres, the flame temperatures attained or developed in front of each such tuyere are substantially higher than those normally developed in conventional blast furnace practice, and generally are over 1860°C. for example. The temperature in this zone or series of zones at the primary tuyeres is sufficient to bring the metal to casting temperature and to melt the slag so that these molten materials drop to the crucible at the base of the furnace and are drawn off in the usual manner. The secondary or bosh zone is located adjacent to and extends above the primary zone, and the temperatures maintained in the secondary zone are below those in the primary zone. In the secondary zone the actual melting of the metallic and slag producing burden materials takes place. The tertiary zone lies above the secondary zone and is a preheating, and reduction zone where metal oxide or oxides are reduced to form the corresponding metal. The temperatures therein are close to but less than 1000°C., the highest temperature being found at the base of the zone or adjacent the second zone. These zones are disposed generally horizontally of the furnace.

In the method of this invention a burden which consists essentially of, for instance, iron ore, coke and a flux such as limestone is prepared and charged in the usual way. A set of conventional primary tuyeres is provided below the bosh and serves to introduce into the primary zones a blast of air or of oxygen-enriched air, heated as will be described, into the base of the furnace. If desired, there is also introduced in the usual manner and as needed, one or more of the auxiliary fuels commonly used in the operation of blast furnaces, such as natural gas, powdered coke, powdered coal or fuel oil and combustion is carried out to bring the temperature in the primary zones to the desired level. The primary zone extends from the mouth of the respective primary tuyere at least to the carbon grate formed in the bosh zone from the furnace burden coke. In the primary zone there will be generated all of the high temperature heat which is required to melt the metallic product and the slag and to provide other secondary zone heat requirements, and maximum practical adiabatic flame temperatures, e.g., of over 1800°C., are obtained in these zones. The "adiabatic flame temperature" is intended to mean the temperature at the hottest point of the flame. Advantageously, these high temperatures can be obtained by using blasts of high temperatures and by incorporating a substantial amount of oxygen therein, e.g., from 25% to 100% oxygen, the remainder, if any, being air.

In order to obtain the high temperature energy required in this zone, the highest available blast temperatures and a large percentage of oxygen in the blast are used in consuming the coke and auxiliary fuels injected at the primary tuyeres. Injections will be controlled to make possible the flame temperatures required. As coke used per ton of hot metal decreases and tons of hot metal produced per hour increase, oxygen addition can be increased if less than 100% is being added, to reduce the volume of gas moving upward by eliminating nitrogen. The higher gas temperatures in the primary zone will not cause the complications normally experienced because the smaller volume of gas will readily be reduced in temperature by introduction of reducing gas at a lower temperature at the secondary tuyeres. The temperature of the upwardly moving gas (measured at several points), top gas composition, stack pressures and stock movement downward will all be monitored. The rapid changes they indicate should be made to achieve the production rate sought and are brought about largely by adjusting the gas temperature, volume, pressure, and composition at one or several tuyere inputs.

It will be noted that the reducing gas stream formed in front of the primary tuyeres is added to and modified as it moves up the stack by reducing gas introduced into the second and third zones through their respective tuyeres. The reducing gases react with the metal oxides to form $CO_2$ and $H_2O$ and the corresponding metals, for example, iron. Gaseous hydrocarbons brought into the primary zone form CO and $H_2$ therein.

The second or secondary zone will include the balance of the bosh area extending upward from adjacent the primary zones to just below the mantel, that is, the bosh area not in the primary zone. The temperature in this zone is slightly less than those in the primary zone. The second set of tuyeres, or the first auxiliary set, is disposed around the periphery of this zone in its upper portion and below the mantel. The temperatures within the second zone generally will range from less than flame temperatures at the bottom of such zone to about 1000°C. at the top of the zone. The height of this zone will be limited by injection of reducing gas at a controlled temperature, which has been generated outside the furnace and which is introduced through the set of auxiliary or second set of tuyeres, located near the top of the zone.

In the second zone there occurs melting of substantially all or at least a major portion of the reduced metal products, such as metallic iron and its metal impurities, and the slagproducing burden materials. Within this zone there will be an area adjacent the primary zone, in which coke will be almost the only unmelted material present. The coke forms a constantly renewed carbon grate through which molten material must flow downwardly and through which the gas which is generated in the primary tuyere zone must move upwardly. In the second zone, the $CO_2$ present therein is reduced to CO. Some of the carbon of the coke is absorbed by the hot molten metal. The principal ironreduction reaction occurring in this zone is as follows:

$$FeO + CO = CO_2 + Fe \qquad (a)$$

This is immediately followed by the following "solution loss" reaction:

$$CO_2 + C = 2CO \qquad (b)$$

By the method of the present invention, the reduction of the iron oxide to metallic iron is at least partially effected and accomplished to a much greater degree in the third or tertiary zone, that is, in the "preheating" or preliminary reduction zone, than in the usual blast furnace operation. Therefore, there is less consumption of carbon in the bosh area than in the usual blast furnace operation. In passage through the second zone, the coke requirement is reduced further when oxygen additions are made at the primary tuyeres sufficient to reduce the amount of gas flow per ton of hot metal. The heat available at over 1000°C. is increased, resulting in an increased high temperature heat utilization per pound of coke consumed. The volume of gas flowing upwardly through the most constricted portion of the carbon grate, that is, through the bosh area, per ton of hot metal is substantially reduced by the method of the present invention; and downward counterflow of molten metal and slag per ton of hot metal is also decreased because of the reduction in coke ash, inasmuch as less coke is consumed per ton of hot metal. The generation of ash, if any, from injected hydrocarbon occurs in major part below the most constricted portion of the coke grate where the counterflow problem is minimal, so that this ash also poses less of a problem. The impairment of burden interstices which is inherent in the premature melting of iron oxides is also largely abated by the method of the present invention because iron oxides are reduced in an area higher in the stack than usual and the high temperature portion is restricted with respect to the height of the stack by the cooling effect of the gas injected through the secondary tuyeres.

The third or tertiary zone is primarily a preheating and reduction zone where the burden is brought up to temperature and the reduction of iron oxide is substantially effected. This zone extends from adjacent the top of the bosh or the mantel to the top of the column of burden and is formed by the reduction in temperature of the gas stream flowing upwardly from the second zone and by adding reducing gas to this gas stream through secondary tuyeres. In a blast furnace suitable for carrying out this stage of the process, a set of auxiliary tuyeres, that is, a third set of tuyeres, is disposed in the furnace stack wall, suitably just above the mantel. Additional amounts of a reducing gas are introduced through this third set of tuyeres and provide CO and $H_2$ to effect reduction of the iron oxide of the burden. As the burden moves downward through the preheating zone or third zone and the freshly introduced auxiliary gas moves upwardly, blending with the gases flowing upwardly from the first and second zones, a major portion of the metallic burden is reduced to form the corresponding metal and $CO_2$ and $H_2O$ where hydrogen is present, with no solution loss or substantial back reaction to CO and $H_2$ respectively.

Suitable bustle pipes or other means to supply gases to the second and third sets of tuyeres are also provided in the conventional manner, or as desired. A portion of the top gases issuing from the blast furnace are sent to a converter or to a converting zone where they are reduced for example advantageously by reaction with non-coking coal particles, to re-form CO and $H_2$, by reaction of the carbon of the coal with the carbon dioxide and water vapor in the blast furnace gases. The re-formed reducing gas is then recycled to the second and third zones to provide the gaseous reducing agents described above. Gases issuing from furnace zones other than the blast furnace zone described above, and containing substantial amounts of carbon dioxide, carbon monoxide, and water vapor can also be introduced into the gas converter wherein carbon monoxide and hydrogen are re-formed and the re-formed and heated gas mixture recycled back to the indicated zone, or zones, of the blast furnace.

According to the present invention, there is also provided an embodiment of a blast furnace suitable for carrying out the process of the present invention.

The use of an oxygen-enriched blast is advantageous not only in increasing flame temperatures in the primary tuyere zone but also in reducing the volume of gas which must move upwardly through the coke carbon grate located mainly in the adjacent portion of the secondary or bosh zone, that is, in the highest temperature portion of the second zone. To attain maximum production, it is necessary to reduce the gas volume/ton of hot metal through this area where upwardly moving gases must compete for interstitial space with the downward flowing molten material. Another advantage of an oxygen-enriched blast is that the substitution of oxygen for air, or for part of the air, in the blast reduces the amount of water vapor introduced in the blast and thus saves the heat which would be consumed in effecting disassociation of the water vapor to hydrogen and oxygen.

Burden coke requirements can be reduced because the combination of the high blast temperatures useable and an oxygen enriched blast generates more high temperature BTU's per pound of burden coke and injected fuel consumed. Also, some of the heat requirements are reduced, there is less steam to be disassociated, the amount of slag related to coke which must be melted will also be reduced because with less coke there is less ash to be fluxed, and heat loss related to the furnace cooling system per ton of hot metal is reduced because the coke required per ton is burned faster, increasing the operating rate and thus decreasing the cooling heat loss per ton. Another advantage is that a substantial portion of the high temperature heat required is derived from sources other than metallurgical coke, including the increased blast temperatures. More high temperature heat is attained per pound of carbon burned to $CO_2$ in this zone because of the higher adiabatic flame temperature used and because of higher-than-usual oxygen input with the blast and higher-than-usual blast temperatures.

A particular advantage of this invention is an increase in the production rate when operating a blast furnace according to the method of this invention. The production rate is increased, at least in part, as a result of reducing the volume of gas coming out of the primary tuyere zone per ton of hot metal and which must flow upwardly through the most congested portion of the furnace burden.

Ecologically, the system of the present invention has great advantages in that basic oxygen fumes which contain dusts, e.g., iron oxide dusts, of very fine particle size and which are thus difficult to collect and to dispose of without danger of water and air pollution can now be put to good uses. By this system, they can be readily utilized as a source of metal and of utilizable oxygen as injections into the tuyeres of the gas converter. Also, roll scale can be utilized in such a converter, whereas it is now lost or discarded when its hydrocarbon content makes it unutilizable. Likewise, the top gases from the blast furnace itself, containing suspended solids, can be recycled in a closed system as described herein, avoiding the exhaustion to the atmosphere or the dumping of the finer collected particles or sintering them in a sinter plant equipped with a baghouse that is costly to acquire and operate. The system provided in this invention thus also enables economic disposition of these steel plant wastes and avoids substantial pollution of the environment.

BRIEF DESCRIPTION OF THE DRAWINGS

The present invention and some modes of carrying it out will be illustrated by the specific description below and also by the annexed drawings wherein.

DETAILED DESCRIPTION OF THE INVENTION

The invention will be described with particular reference to the arrangement shown in FIGS. 1 and 2, like parts being indicated by the same numerals.

Figure 1:
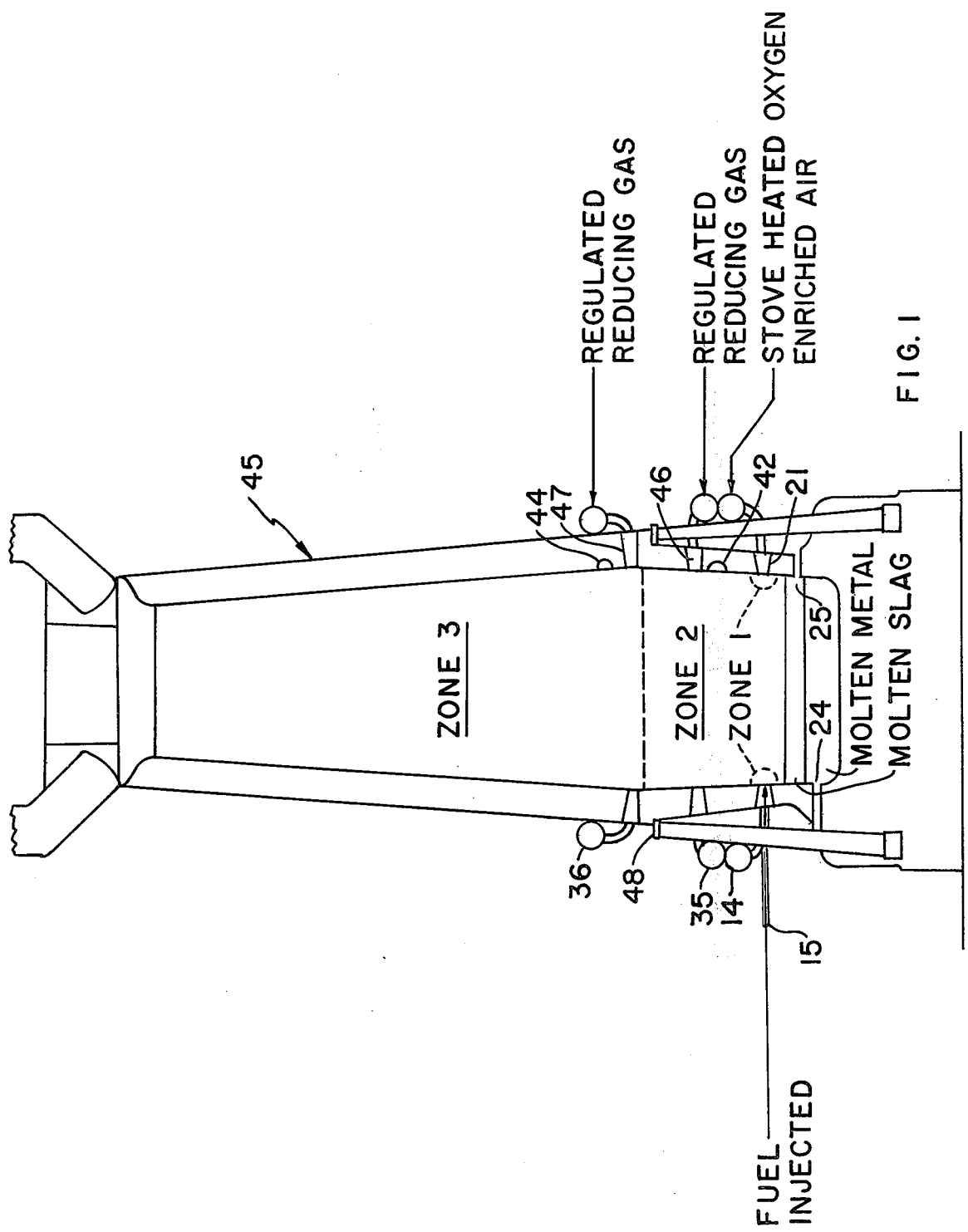
FIG. 1 is a schematic vertical sectional view of a blast furnace and associated equipment according to the present invention which are suitable for carrying out the process of this invention.

FIG. 1 shows schematically a cross section of a modified blast furnace 45 having three sets of tuyeres, i.e., a primary or conventional set 21 disposed around the periphery of the furnace 45 in the hearth or melting zone, a secondary set 46 disposed similarly in the bosh zone and a third set 47 disposed in like manner just above mantel 48. Take-off gases from the top of furnace 45 are cycled to a gas converter 54 of any desired type where they are reacted with a carbonaceous reducing agent to reduce the $CO_2$ and $H_2O$ content to CO and $H_2$, respectively, and these re-formed reducing gases are now sent to a pair of manifold or bustle pipe 35, 36 to which are connected tuyere sets 46 and 47, respectively, so that the reducing gases can be injected into the furnace. The temperature of the gases injected into tuyere set 46 is advantageously from about 900° to about 1000°C. so as to mix with and cool the gases moving upwardly from the first zone. The temperature of the blended gas stream is close to 1000°C. by the time it reaches the upper end of the second zone. The gases withdrawn from converter 54 or another type of such device may require a cooling treatment, to attain the aforesaid object, before being injected into tuyere set 46 and can be cooled in any desired device (not shown) or by blending with unprocessed blast furnace top gas as shown in FIG. 2. The gases injected into tuyere set 47 are advantageously at a temperature close to 1000°C. They provide a gas mixture with the upward-flowing furnace gases having a temperature close to but less than about 1000°C. and if necessary are also cooled before entering manifold 36 by being blended with blast furnace exit gas through gas line 52 as shown in FIG. 2. Temperatures at two points in the second and third zones are suitably measured by conventional thermocouples 42 and 44, respectively, connected to suitable recording devices (not shown). That is to say, temperature sensing means are associated with each of the sets of auxiliary tuyeres and are disposed in the secondary and tertiary zones.

Figure 2:
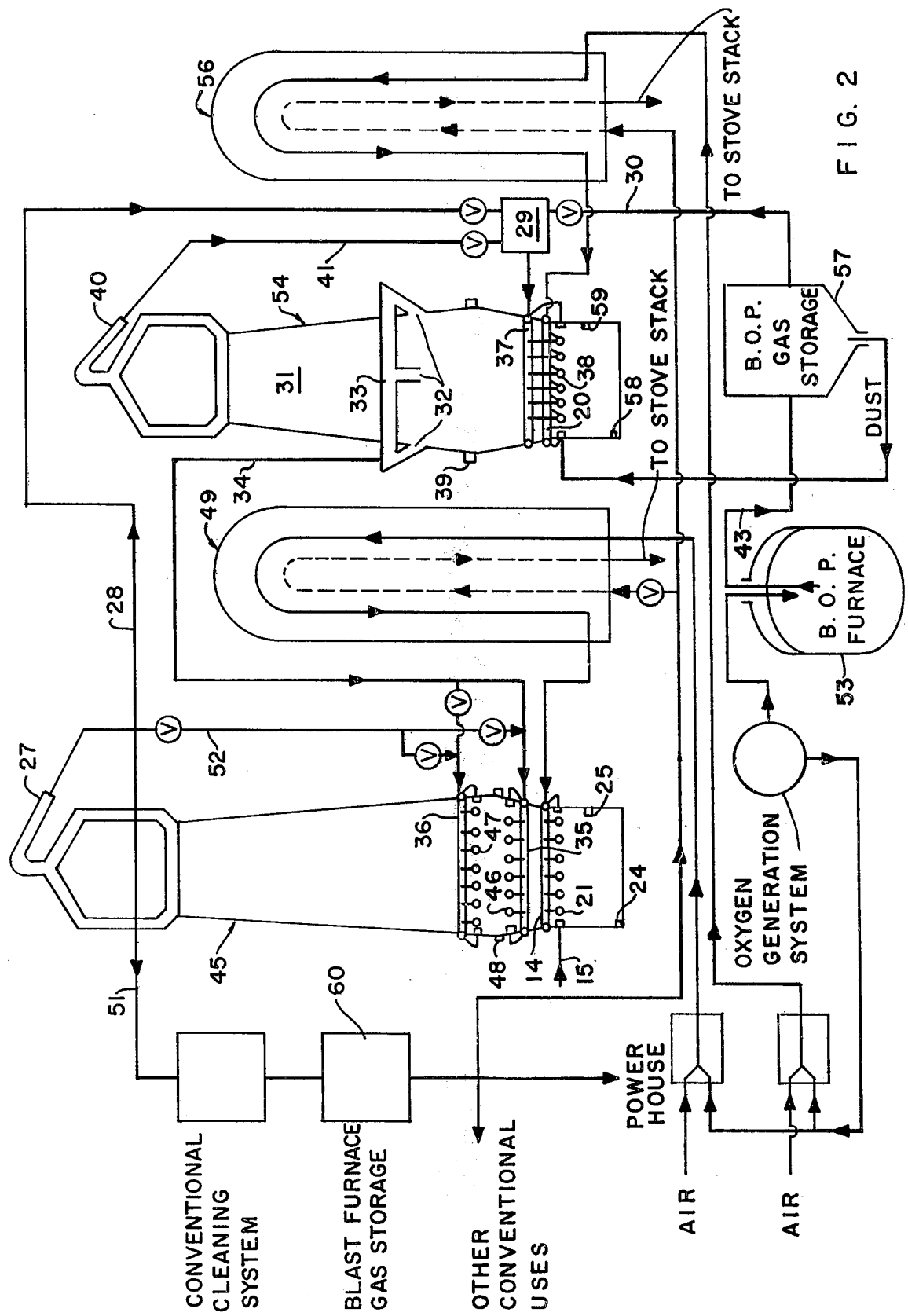
FIG. 2 shows schematically a system suitable for carrying out the present invention, including a gas converter device.

The schematically illustrated blast furnace 45 of FIG. 2 as in the case of the furnace 45 of FIG. 1 is provided with a primary set of tuyeres 21, a secondary set 46 and a tertiary set 47. Each set of tuyeres is disposed around the periphery of the blast furnace forming a circle of each set in the usual manner, primary tuyere set 21 being disposed in the hottest or hearth zone of the furnace, secondary set 46 being disposed in the upper portion of the bosh zone and below the mantel 48, and tertiary set 47 being disposed just above the mantel and at the bottom of zone 3 of the furnace. Primary tuyeres 21 are provided with a conventional bustle pipe 14 which feeds to the tuyeres a hot blast, preferably substantially hotter than normal practices and wherein the blast can be air or oxygenenriched air, for instance. In this embodiment, each individual tuyere in the secondary set of tuyeres 46 is disposed vertically directly above a corresponding tuyere in the primary set of tuyeres 21; and each tuyere in the tertiary set 47 is disposed in offset fashion above and on a vertical line suitably midway between, corresponding tuyeres in the secondary set 46, in order to provide the best distribution of the reducing gases into and through the descending burden of the furnace.

The base of the blast furnace 45 in each of FIGS. 1 and 2 is provided with an iron notch 24, where molten iron is tapped at intervals, and with a slag notch 25 disposed a suitable distance above iron notch 24 in the conventional manner, so that slag can be withdrawn as desired from such notch 25. In other words, there is a generally molten mass of two layers at the base of the furnace, as indicated in FIG. 1, the lower layer being the molten iron with molten metallic impurities and the upper layer being the molten slag.

The upper portion of blast furnace 45 is not completely shown. The furnace will be fed using equipment modern enough to keep the furnace continuously charged in the conventional pattern at the higher operating rates which will be attainable by use of the instant invention. Any desired amount of the furnace gases thereof, exiting through downcomer 27 are passed through a conduit 23 to a gas converter 54 which in the embodiment of FIG. 2 is in the form of a modified blast furnace. Converter 54 is provided with primary tuyeres 38 to introduce heated air or oxygen-enriched air into the converter and also with a conventional bustle pipe 20. Solid carbonaceous reducing agents, such as non-coking coal and limestone flux, are added at the upper portion 31 of the converter; and the gas from the blast furnace downcomer 27 and containing $CO_2$ and $H_2O$ to be converted back to CO and $H_2$, is introduced into the converter through a suitable manifold or bustle pipe 37 usually after mixing BOP gas and converter top gas and thence through an injection system which is a part of the primary tuyere assembly 38 at the base of the converter. The incoming gas is passed upwardly through the bed of hot coal and the $CO_2$ and $H_2O$ content is reduced to form the desired CO and $H_2$, while at the same time any metal oxide present is reduced to form the corresponding metal. For instance, there can also be introduced into bustle pipe 37 via mixer 29 take-off gas from a basic oxygen process (BOP) steel furnace. The basic oxygen process furnace gas contains $CO_2$ but is very rich in CO and it is introduced hot and without cleaning into the converter. The basic oxygen furnace gas also contains micron size iron oxide fume particles which are ordinarily difficult to collect or process. The CO content can be readily utilized in the system of this invention, and the $CO_2$ converted to CO. The iron content will also be readily recovered by the above-noted reduction procedure.

The re-formed reduction gas from the converter is taken off at the side of the converter above the bosh and mantel thereof and conducted to bustle pipes 35 and 36 from which it is fed into the secondary and tertiary sets of blast furnace tuyeres 46 and 47 respectively. In this embodiment of a gas converter 54, the re-formed gases to be delivered to the blast furnace are taken off above the mantel 39 at which point they are at about the desired temperature and suitable for introduction into the blast furnace 45. If it is desired to use a portion of the re-formed gas for other purposes, it can be taken off at the top of converter 54.

It can be seen by the present method, as above described, that the temperature of the up-moving gas streams in the blast furnace 45 will be such as to produce a burden-gas heat interchange which will substantially limit the conversion of $CO_2$ to CO and $H_2O$ to $H_2$ and CO by reaction with the coke to zones one and two in the primary tuyere and bosh areas. This is effected by maintaining the coke above zone two below the temperature at which such reactions will occur, with their attendant loss of coke and by maintaining a sufficient reducing gas supply at an adequate top pressure to satisfy the metallic oxide reduction requirements mainly in zone three. It is also advantageous to prevent all portions of the burden in the tertiary zone from attaining temperatures at which the metallic oxides, for example, iron oxides, are prematurely melted. The tertiary set of tuyeres is used effectively to introduce the additional volume of heated reducing gas required to help reduce the major portion of the metallic oxide burden in zone three.

In carrying out the method of the present invention, the furnace is charged with an admixture of metallic oxide, which can be in the form of ore, pellets or sinter, limestone and coke. This is done according to usual practice in this art except that the amounts of limestone and coke will be reduced. The hot blast is introduced into the tuyeres 21 in the primary zone and reducing gases are introduced into the secondary tuyeres and tertiary tuyeres 47, all as described above. In the operation of the furnace it will frequently be desirable to make changes which will result in either a maximum tons of hot metal per operating hour rate, a desired tons per hour operating rate, or a lowest hot metal cost per ton operating rate. For example, the most economic blowing rate will be lower than the rate required to obtain highest production and, accordingly, various adjustments are made in the blowing rate, depending on the production rate desired. Other changes, such as in the amount of added oxygen or the temperature of the hot blast, are also made as desired. When a combination starts to produce the desired result, the functions are then monitored in such a manner that minor burden fluctuations and trends leading to furnace malfunction are immediately detected and the indicated suitable adjustments required immediately made. To this end, continuous monitoring measurements will be made usually including those of top pressure, top temperature, top gas composition, top gas flow, bottom pressure, slag temperature, and hot metal, burden, and blast air analyses. For example, low slag temperatures may indicate that there is danger that the sulphur content of the hot metal is becoming excessive. To get highest production rates, higher amounts of oxygen, higher adiabatic flame temperatures, higher blowing rates and high top pressures ordinarily will be used. As one monitoring means, the temperature at a point in each zone is continuously determined by means of a thermocouple placed therein and the temperature is recorded in the usual manner.

During the functioning of the system of FIG. 2, the following operations take place. Raw materials are delivered to the top of the furnace 45 according to good modern practice, except that the quantity of coke and limestone required per ton of feed is less. The amount of coke per ton of hot metal can be reduced by at least 20%, and that of limestone by at least 25%. However, the increase in the operating rate will offset these gains and put a full load on the raw material delivery system. Fuel in the form of crushed coal, coke or coal tar is also introduced into the hearth zone of the furnace at 15 by a conventional injection system. Most of the high temperature heat, i.e., above 1000°C., is utilized in the second zone adjoining the primary or tuyere combustion zone. The size, i.e., the height, of this secondary zone is determined or controlled by the addition of reducing gases injected through secondary tuyeres 46. Such gases will blend with the higher temperature gases from the primary zone reducing their temperature as required to attain zone control.

In this embodiment, reducing gases that are fed to the blast furnace 45 through auxiliary tuyeres are generated in a gas converter 54, which is designed in the form of a modified blast furnace, as also indicated and described in part above.

In the system of this embodiment a portion of the top gases from blast furnace 45 are conducted by main or pipe 28 to a gas mixer 29 where they may be blended with gases which have issued from a hooded BOP furnace 53, wherein steel is being made by the well-known oxygen process, and stored in a holder 57. Another portion of the blast furnace top gases is sent to a cleaning system by conduit 51 and thence to storage; and a third portion, if and as needed to control the temperature of reducing gas being injected, goes by conduit 52 to be mixed with reducing gases entering the blast furnace through the secondary and tertiary tuyere sets 46 and 47. The oxygen steel and blast furnace top gases in admixture contain $H_2O$, CO, $CO_2$ and very finely divided iron oxide, e.g., one micron size particles, and the admixture is injected into the gas converter 54 in the manner described above. The oxygen-enriched air blast from a turboblower 55 is suitably heated in the gas converter stove 56 fired by blast furnace gas from storage unit 60 and is then conducted to bustle pipe 20 and primary tuyeres 38. Oxygen steel furnace gas and fumes from holder 57 can also be injected by the system that works in conjunction with the primary tuyeres receiving the hot blast. Molten metal, e.g. iron, is formed during the reactions in the gas converter and is withdrawn at notch 58, while slag is taken off at notch 59. The carbon dioxide, $CO_2$, and water vapor, $H_2O$, contained in the incoming gases, which flow upwardly through the hot carbon charge, derived from the coal feed, are heated and reduced, respectively, to CO and $H_2$ in converter 54. The re-formed gaseous product is taken off at uptake 32 into manifold 33 of converter 54 and flows through conduit 34 to blast furnace bustle pipes 35 and 36. If desired, an amount of top gas coming from the blast furnace 45, through pipe 52, is mixed with the re-formed gases to provide gas at a suitable temperature prior to entering the second and third zones of the blast furnace 45. By control of the three furnace zones of blast furnace 45 as described herein, a major portion of the iron oxide component of the burden is reduced to metallic iron in the third, or topmost zone, a good reducing atmosphere being provided by a controlled injection of the reducing gases as shown.

In the prior conventional methods of operating a blast furnace, there have been no practical methods of making independent additions to the various zones. For instance, there was no method for increasing the reducing gas and controlling temperature in the topmost zone per se, nor of developing high adiabatic flame temperatures while at the same time avoiding enlargement or distortion of the primary, highest temperature zone. For example, if more high temperature heat is required in the bosh zone and it is obtained by increasing the adiabatic flame temperature, this may also increase the area of the zone wherein $CO_2$ is converted to CO by reaction with coke at over 1000°C. and this will result in larger coke consumption and will tend to decrease permeability of the burden because of premature melting of iron oxide. Such undesirable results can be avoided by practicing the method of this invention. Corrections in furnace operation can be effected manually, semi-automatically or automatically, and a process computer can be employed. A correction can be effected, for example, by changing the temperature or amount of gas injected at the secondary tuyeres, or by like changes in the re-formed gas injected at the tertiary tuyeres. Whereas the precise continuous measurement of solid burden constituents and changes therein is difficult, changes in composition and other characteristics of the furnace gases can be more precisely and continuously measured and changes in furnace operation made accordingly. Changes in gas temperatures, pressures and compositions and volumes can be monitored by appropriate devices installed at crucial points in the system and furnace, recorded and followed to effect the required changes.

It will be understood that the above specific description and drawings have been given for purposes of illustration only and that variations and modifications can be made therein without departing from the spirit and scope of the appended claims. For instance, any desired device or method of reducing the $CO_2$ and $H_2O$ components of the furnace gases to re-form CO and $H_2$ can be employed other than the converter which has been described more specifically hereinabove.

Having described the invention, what is claimed is:

1. The method of treating off gases from iron processes which comprises establishing a bed of hot solid carbonaceous reducing agent in a reformer, adding an oxidizing gas to said reformer to maintain said solid carbonaceous fuel as a hot bed, conducting said off gases containing $CO_2$ and fine iron oxide particles to said reformer without an intermediate step that removes said fine particles, and introducing said off gases into the lower portion of said hot bed of carbonaceous solid reducing agent, whereby iron oxide is reduced to metallic iron and $CO_2$ is converted to CO, withdrawing molten iron from the base of said reformer and withdrawing CO containing gas from said reformer.

2. The method of claim 1 wherein coal is employed in said conversion furnace.

3. The method of claim 1 wherein roll scale is employed in said conversion furnace.

4. The method of claim 1 wherein off-gases from a basic oxygen steel furnace are conducted to said conversion furnace.

5. The method of claim 1 wherein said hot carbonaceous bed also contains a flux.

6. The method of claim 1 wherein said carbonaceous bed is a bed of non-coking coal.

* * * * *